(12) United States Patent  
Davies (10) Patent No.: US 6,467,762 B1
(45) Date of Patent: Oct. 22, 2002

(54) POSITIONING MECHANISM (75) Inventor: Philip Andrew Davies, Cambridge (GB)

(73) Assignee: Nelles Griot Limited, London (GB)

( * ) Notice: Subject to any disclaimer, the term of this patent is extended or adjusted under 35 U.S.C. 154(b) by 0 days.

(21) Appl. No.: 09/702,353

(22) Filed: Oct. 30, 2000

Related U.S. Application Data (62) Division of application No. 09/251,555, filed on Feb. 17, 1999, now Pat. No. 6,193,226.

(30) Foreign Application Priority Data

Feb. 20, 1998 (GB) ............................................. 9803716

(51) Int. Cl.[7] .................................................. B23Q 1/25
(52) U.S. Cl. ......................................... 269/71; 359/391
(58) Field of Search ............................... 269/71; 359/391

(56) References Cited

U.S. PATENT DOCUMENTS

| | | | |
|---|---|---|---|
| 3,848,963 A | 11/1974 | Peck | |
| 4,139,948 A | 2/1979 | Tsuchiya et al. | |
| 4,523,383 A | 6/1985 | Rogers et al. | |
| 4,637,777 A | 1/1987 | Smulders et al. | |
| 4,691,586 A | 9/1987 | van Leijenhorst et al. | |
| 4,773,727 A | 9/1988 | Le Pivert et al. | |
| 4,976,582 A | 12/1990 | Clavel | |
| 5,029,398 A | 7/1991 | Etrl | |
| 5,357,366 A | 10/1994 | Marchlenski | |
| 5,412,503 A | 5/1995 | Nederlof | |
| 5,583,691 A | 12/1996 | Yamane et al. | |
| 6,236,503 B1 * | 5/2001 | Kaczynski | 359/391 |
| 6,252,705 B1 * | 6/2001 | Lo et al. | 359/393 |

FOREIGN PATENT DOCUMENTS

| | | |
|---|---|---|
| GB | 639 674 | 11/1940 |
| GB | 1 252 667 | 1/1969 |
| GB | 2 067 783 | 12/1980 |
| GB | 2 129 955 | 11/1982 |
| GB | 2 185 323 | 10/1984 |
| WO | 92/12450 | 7/1992 |

* cited by examiner

Primary Examiner—Joseph J. Hail, III
Assistant Examiner—Daniel Shanley
(74) Attorney, Agent, or Firm—Renner, Otto, Boisselle & Sklar (57) ABSTRACT

A mechanism for a multi-axis flexure positioner includes a fixed part and a movable part (7), the movable part (7) being connected to the fixed part via a plurality of transmission means, one for each axis, for transmitting actuation forces for the respective axes to the movable part (7). The transmission means for each axis includes a flexure member (2,3,8) arranged to transmit actuation forces for that axis to the movable part (7) and to flex between the fixed part and the movable part in response to actuation forces associated with the or each other axis. There are three flexure members (2,3,8) arranged to extend along three mutually-perpendicular axes so that each flexure member (2,3,8) is flexible along the axes of extent of the other two flexure members (2,3,8). Each of the three flexure members (2,3,8) comprises a pair of flexure linkages arranged to extend parallel to each other, the three pairs of linkages thus defining three mutually-perpendicular planes.

12 Claims, 10 Drawing Sheets

POSITIONING MECHANISM

RELATED APPLICATION DATA

This application is a division of U.S. patent application Ser. No. 09/251,555 filed Feb. 17, 1999 U.S. Pat. No. 6,193,226.

BACKGROUND OF THE INVENTION

This invention relates to a mechanism for a positioner and to a positioner having such a mechanism, more especially to a multi-axis positioning mechanism.

Positioners have many scientific and industrial applications.

One application, for example, is the positioning of optical fibres relative to each other, relative to waveguides, laser diodes, detectors etc, prior to testing and joining. This type of positioning has to be very precise, typically of sub-micron precision, and is commonplace in research and production facilities in the telecommunications industry.

Another application is for positioning optical or non-optical components, such as mirrors, lenses or samples beneath microscopes.

There are two main types of precision positioning stage, those based on bearings and those based on flexure hinges. The simplest form of both types of design produce linear motion, so called x-positioners. Both types of design can however be adapted to produce rotary motion with additional linkages and the like, so called $\theta$-positioners.

Many applications require not one, but several, axes of motion. This is obtained by stacking several stages. For example, bolting the top plate of one bearing stage to the base of another linear stage so that the respective positioning axes are at right angles to each other will produce a two-axis positioner, or so-called xy-positioner. Moreover, by then bolting an L-bracket onto the top-plate of the y-stage and a further bearing stage onto the upright of the L-bracket, a three-axis positioner, or so-called xyz-positioner, is produced.

Sometimes multi-axis positioners are supplied as integrated units. For example, in an xy-positioner, the top plate of the x-stage can also serve as the base plate of the y-stage, to reduce size and weight.

Flexure stages can also be nested in various ways to make them more compact.

However, the integration of parts in this way does not affect the basic principle of operation which is to use a number of similar mechanisms connected serially.

There are however several drawbacks to the use of a series of single axis mechanisms for multi-axis positioners:

1. The complexity and cost tends to increase with the number of axes.
2. The mass of moving parts increases with the number of axes, making the positioner slower to respond and more susceptible to ambient vibrations.
3. The force of adjusting a micrometer (other than that of the first stage) is transmitted through the preceding stages, causing disturbance to the position of the stages.
4. The stiffness of the positioner decreases as the number of axes increases.

BRIEF SUMMARY OF THE INVENTION

According to the present invention there is provided a mechanism for a multi-axis flexure positioner, the mechanism including a fixed part and a movable part, the movable part being connected to the fixed part via a plurality of transmission means, one for each axis, for transmitting actuation forces for the respective axes to the movable part, the transmission means for each axis including a flexure member arranged to transmit actuation forces for that axis to the movable part and to flex between the fixed part and the movable part in response to actuation forces associated with the or each other axis, wherein there are three flexure members arranged to extend along three mutually-perpendicular axes so that each flexure member is flexible along the axes of extent of the other two flexure members, each of the three flexure members comprising a pair of flexure linkages arranged to extend parallel to each other, the three pairs of linkages thus defining three mutually-perpendicular planes.

Preferred embodiments of the invention incorporate up to six axes of motion into a positioning mechanism of this kind. Once fitted with actuators, such as micrometers, the positioning mechanism forms a multi-axis positioner, preferably a micropositioner, with a corresponding number of axes of motion.

In the preferred embodiments, the movable block of the positioner is supported by six linkages, each linkage being thinned towards each end to give the linkage flexibility to bend in two directions and to twist about its axis of extent.

The new design allows multi-axis positioners to be made which have one or more of the following advantages:

1. Low mass of moving parts—better response time, more resistance to ambient vibrations.
2. Adjusting a micrometer, or other actuator, for one axis does not result in force being transmitted through the mechanics of the stage and disturbing the positions set by the or each other stage.
3. Greater stiffness resulting from the parallel rather than serial action of the linkages.
4. Because there are fewer parts in series, lost motion among adjacent parts is minimized and the overall precision is improved.
5. Simpler design, lower cost.

These advantages become more significant as the number of axes increases.

A sub-micron positioning precision is achievable.

Further aspects of the invention are exemplified by the attached claims.

BRIEF DESCRIPTION OF THE DRAWINGS

For a better understanding of the invention, and to show how the same may be carried into effect, reference will now be made, by way of example, to the accompanying drawings, in which:

FIGS. 4 to 6 are scale technical drawings of the positioning mechanism of the first embodiment, being arranged on a single sheet of the drawings in third angle projection, FIG.

4 being a plan view, i.e. along the z-axis, FIG. 5 a side view along the x-axis and FIG. 6 a side view along the y-axis;

DETAILED DESCRIPTION

Figure 1:
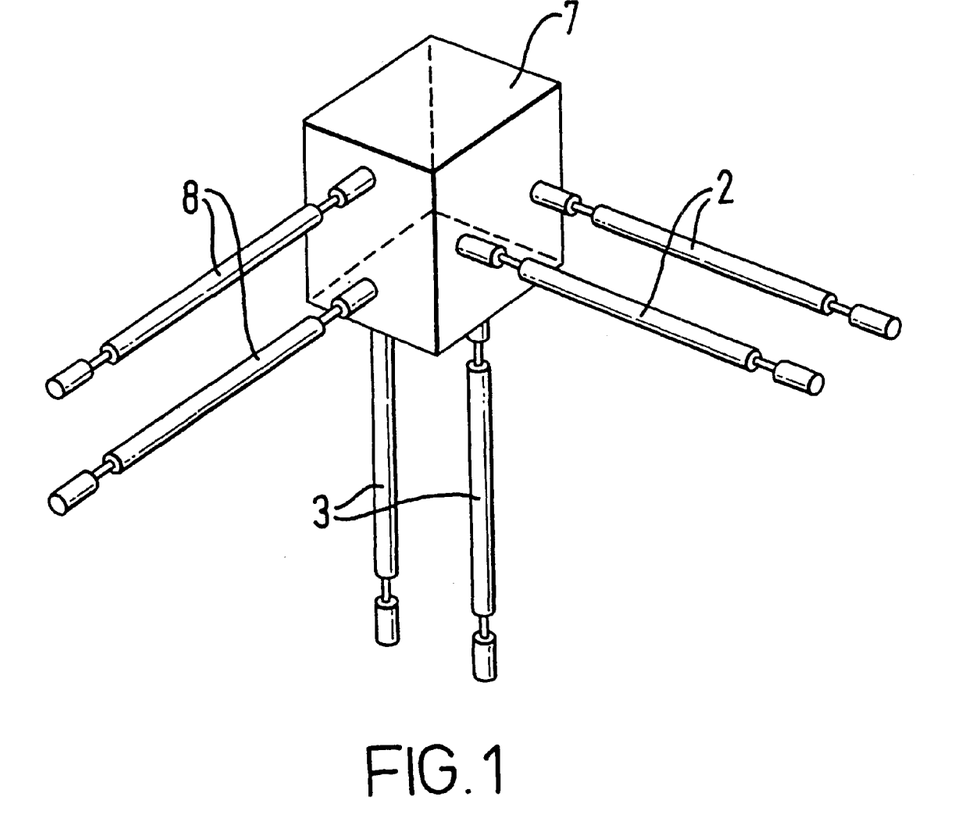
FIG. 1 is to illustrate the principles of operation of the positioning mechanisms of first and second embodiments of the invention and shows schematically a movable block and three pairs of linkages.

FIG. 1 is to illustrate the principles of operation of the positioning mechanisms of embodiments of the invention.

A movable block 7 is shown supported in space by three pairs of linkages 8, 2 and 3 via which the block 7 is moved in use. The three pairs of linkages are arranged to extend along mutually orthogonal axes x, y and z respectively. Moreover the ones of each pair of linkages extend parallel to each other, so that each pair of linkages lies in a plane, this plane being perpendicular to the equivalent two planes in which the other two pairs of linkages lie. Before describing how the block 7 is moved in use, the design of the linkages is first described in more detail.

Each linkage needs to be rigid in respect of forces applied along an axis of extent of the linkage, referred to as lengthways in the following, but deformable in respect of forces applied across that axis of extent, referred to as sideways in the following. Consequently, a force applied to one end portion of the linkage substantially lengthways will be transmitted to the other end portion of the linkage, whereas a force applied to one end portion of the linkage sideways will not be transmitted to the other end of the linkage, but rather accommodated by lateral deformation of the linkage. That is, the linkage has a relatively high stiffness along its extent combined with a relatively low shear stiffness in respect of shear across its extent in at least one, but preferably all, lateral directions. It is also preferable that the torsional stiffness be relatively low in embodiments, such as the second embodiment, where rotary motions are possible.

Figure 2:
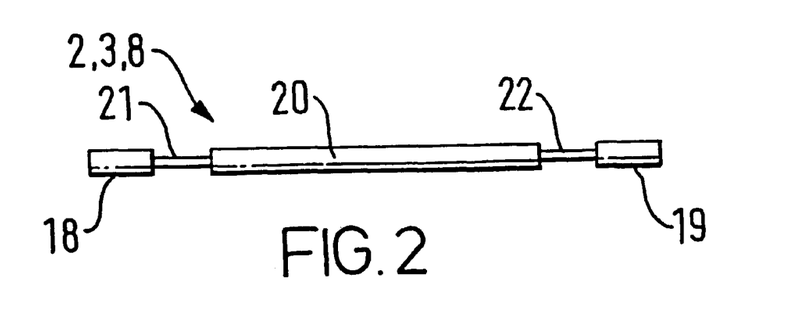
FIG. 2 shows a linkage used in the first and second embodiments of the invention.

The linkage shown in FIG. 2 is the design chosen to provide the desired lengthways rigidity and lateral and torsional deformability in the embodiments of the invention. The linkage comprises two end portions 18 and 19 disposed on either side of a central portion 20, the central and end portions being interconnected by two flexible portions 21 and 22. The central and end portions 18 to 20 are made of sections of stainless steel rod of 3 mm diameter. The central portion is around 25mm in length and the end portions 10 mm. The flexible portions 21 and 22 are made of sections of music wire of 1 mm diameter and are each around 15 mm in free length with around 10 mm at each end received in bores in the central and end portions and cemented in place by adhesive bonding, thus to leave a free length of the wire sections of around 10 mm.

Music wire is chosen since it allows a large degree of elastic bending and torsion without reaching the plastic limit. Other spring steel elements, or other suitable elements with similar properties, could also be used.

Returning to FIG. 1, the linkages 2, 3 and 8 are arranged with their end portions 19 located in the movable block 7 and their end portions 18 arranged to receive respective actuation forces from respective actuators (not shown in FIG. 1), for example micrometers.

Thus, if, for example, both of the linkages 8 are displaced together equal distances, the block 7 will be translated in a horizontal direction. During the horizontal translation, the ends of the other linkages 2 and 3 remote from the block 7 are held fixed so that these linkages are subject to shear strain, as viewed along their respective axes of extent, which is accommodated by flexure of the flexible portions of the linkages.

As will now be appreciated, the above-described geometric arrangement in which the three pairs of linkages extend along mutually orthogonal axes x, y and z respectively, can only be precisely fulfilled for one position of the movable block 7, this one position being referred to in the following as the nominal position. Moreover, in the following, a general position of the block will be referred to as the set position.

The set position can thus be varied in use by adjusting the position of the end portions 18 of the linkages arranged remote from the block. For a given pair of linkages, movement of the end portions 18 through equal distances will produce translation of the movable block 7, as in the above-described example, and movement of the end portions 18 through different amounts will produce rotation of the block 7.

Six linkages provide the exact desired number of constraints to hold the block 7 rigidly in a set position, six is thus the preferred number of linkages. If there are fewer than six linkages, the block will not in general be held rigidly. If there are more than six linkages, some of the linkages provide redundant constraints:and as a result residual forces exist within the system.

It is noted that in FIG. 1 the movable block 7 is illustrated as having the shape of a cube. This shape is chosen purely for ease of explanation. In reality, a cubic shape will not generally be the optimum shape, as will be appreciated further below. The movable block 7 may be a rigid body of any convenient shape.

In the following embodiments, the end portions 18 are attached to plates (not shown in FIG. 1) the mounting of which depends on the axes of motion required.

Figure 3:
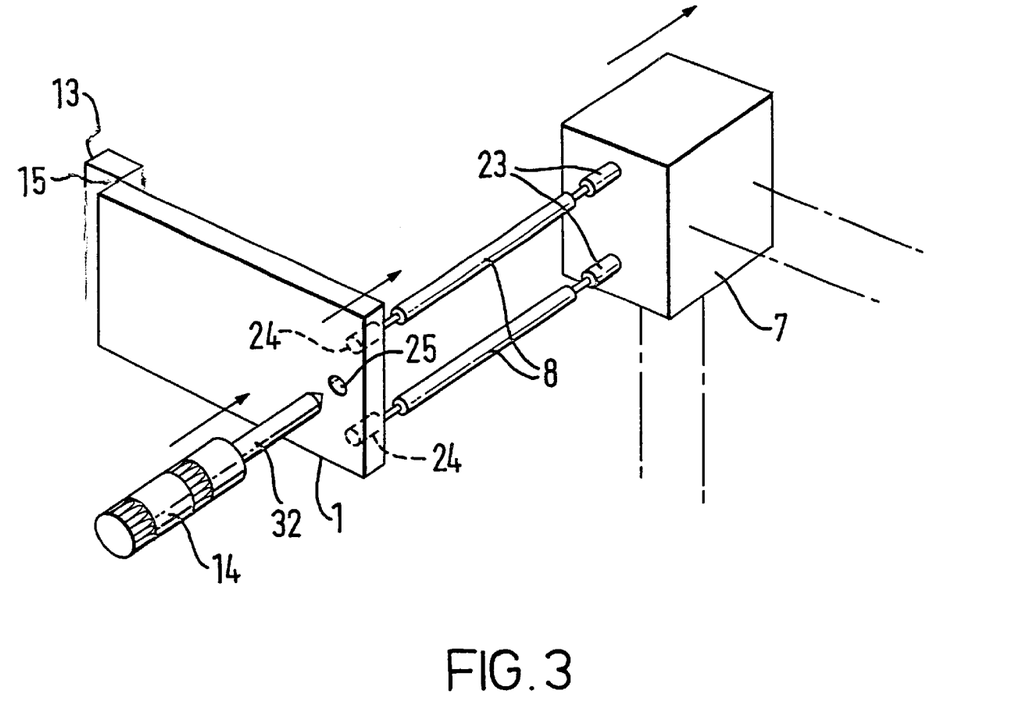
FIG. 3 is to illustrate the principles of operation of the positioning mechanism of the first embodiment of the invention, which is an xyz-positioning mechanism, and shows schematically a movable block, one pair of linkages, a hinged plate and an actuator.
Figure 4:
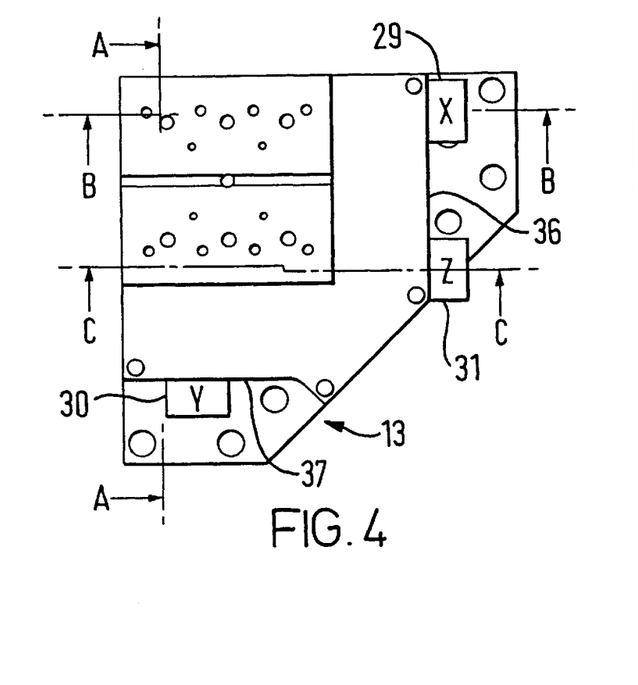
Figure 5:
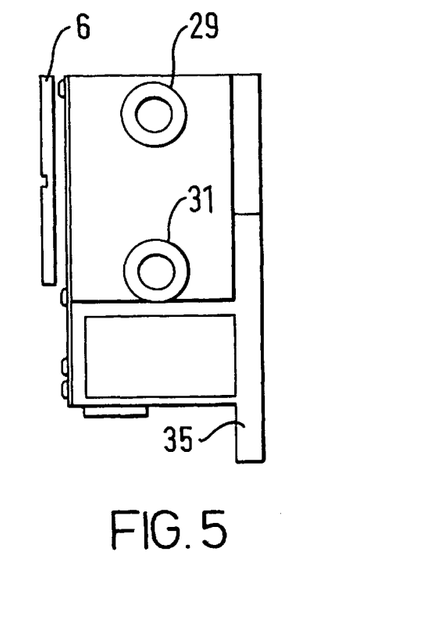
Figure 6:
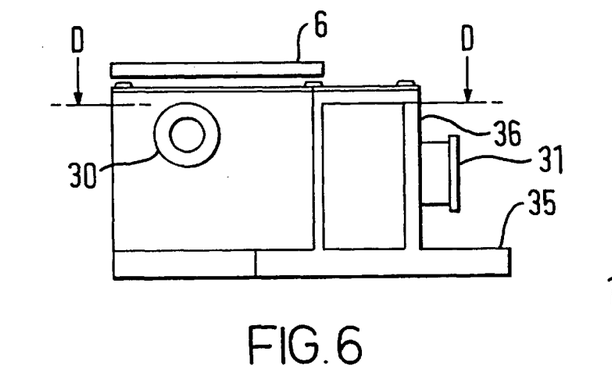
Figure 7:
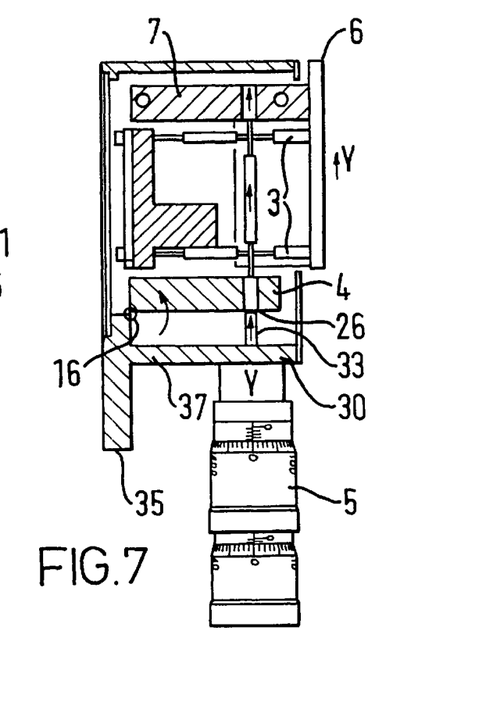
FIGS. 7, 8 and 9 are scale technical drawings respectively through sections 'AA', 'BB' and 'CC' of FIG. 4, also showing actuators fitted to the positioning mechanism.
Figure 8:
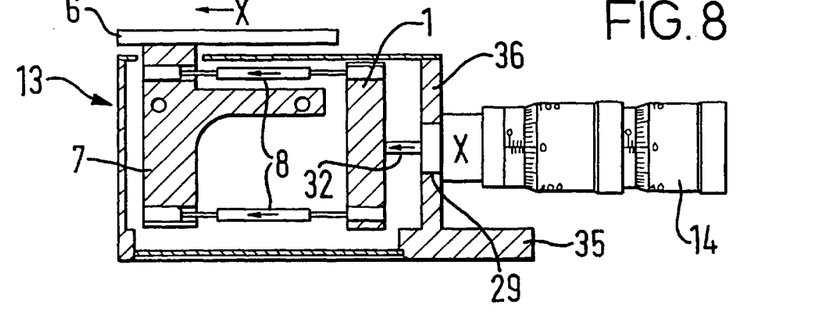
Figure 9:
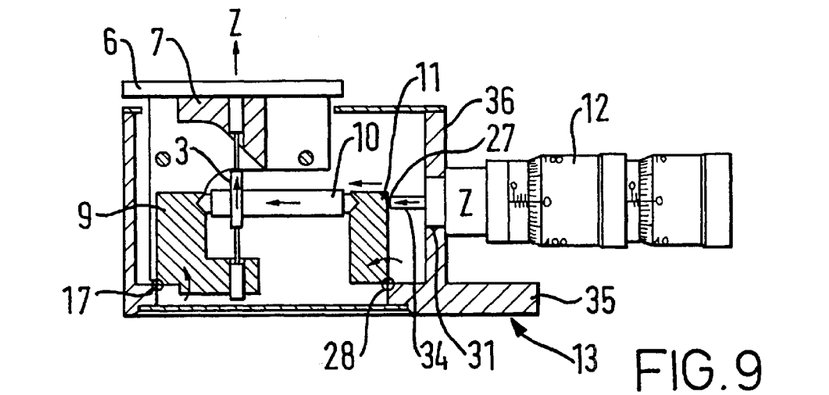
Figure 10:
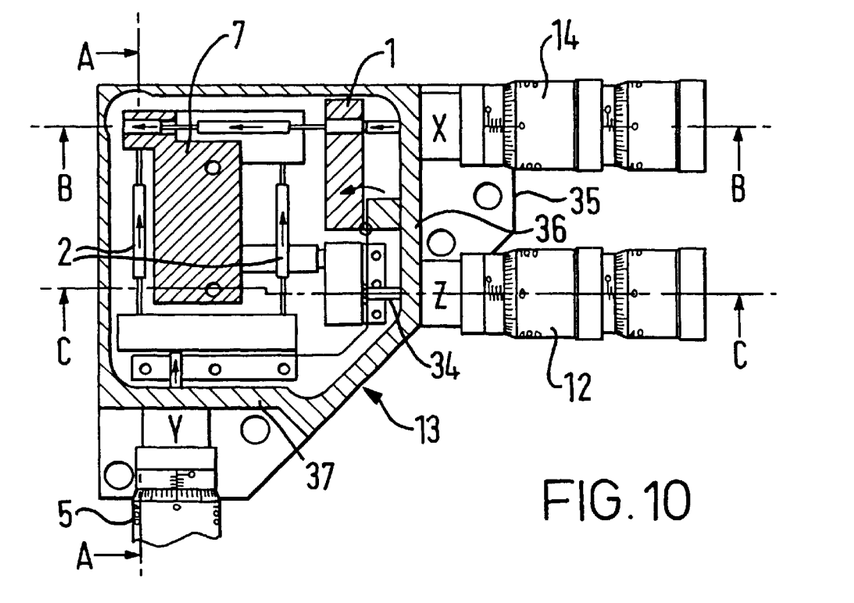
FIG. 10 is a scale technical drawing through section 'DD' of FIG. 6, also showing actuators fitted to the positioning mechanism.

FIG. 3 shows, highly schematically, the plate mounting arrangement adopted in the first embodiment of the invention, this arrangement being suitable for providing a linear movement of the block 7, by causing the ones of a pair of the linkages 8 to move together equal distances.

In addition to the components shown in FIG. 1, FIG. 3 shows a plate 1 which is hingedly mounted relative to a case 13 via a hinge 15. The plate 1 need not literally have the form of a plate, but may be a rigid body of arbitrary shape arranged to rotate about a single axis in the manner of a hinge. The hinge axis is arranged to lie along a line parallel to a line drawn between the points where the linkages 8 meet the plate 1. On the side of the plate facing towards the movable block 7, the end portions 18 of the linkages 8 are located by locating means 24. (The end portions 19 of the linkages are located by locating means 23 of the block 7). On the other side of the plate, i.e. the side facing away from the movable block 7, there is a contact region 25 at which a micrometer 14 acts via the end of its spindle 32. The micrometer is mounted on the case 13 by micrometer mounting means (not shown in FIG. 3). Although a micrometer is shown, the actuator may be of any type, for example motorised fine thread or piezoelectric.

A tension spring (not shown) holds the region 25 of the plate 1 in contact with the end of the micrometer spindle 32. The tension spring is connected at one end to the block 7 and extends through a through hole in the plate 1, being connected at its other end to a part of the case 13 located behind the plate 1.

In use, the micrometer 14 moves the plate 1, in turn moving the pair of linkages 8, causing the block 7 to move in an approximately straight line parallel to the linkages 8. The movement does in fact have small arcuate components as a result of the geometrical constraints imposed by the other pairs of linkages 2 and 3, which must bend to accommodate movement of the linkages 8. This effect is analogous to the motion of a conventional one-axis flexure stage.

When three hinge plate mechanisms of the kind shown in FIG. 3 are used, a three-axis positioner can be provided, allowing movement of the block 7 in three linear directions X, Y, & Z.

In the arrangement shown in FIG. 3, motion is transmitted directly from the micrometer to the plate. It is however in some instances preferable for motion to be transmitted to the plate from the micrometer indirectly, such as by means of an intermediate crank or linkage. An example of an indirect drive of this kind is described further below for the z-transmission of the first and second embodiments. By contrast, the x- and y-transmissions in these embodiments are direct.

A practical example of a three-axis positioner according to the first embodiment is shown in FIGS. 4 to 10 and will now be described. For ease of manufacture, the movable part of the positioner is made of two parts which are bolted together, namely block 7 and platform 6 which serves as a top plate on which the optical fibre, lens or whatever can conveniently be mounted. Because these parts are bolted together, they behave as one rigid body. The six flexible linkages are arranged in three pairs, namely flexible x-linkages 8, flexible y-linkages 2 and flexible z-linkages 3. It can be seen that the three pairs lie in mutually perpendicular planes. One end of each linkage is attached to the block 7. The other ends of the respective pairs of linkages are attached to respective ones of the hinged plates, namely hinged x-plate 1, hinged y-plate 4 and hinged z-plate 9.

If the x-micrometer 14 is displaced, the x-plate 1 moves about its hinge. The ends of the flexible x-linkages 8 attached to the plate 1 move through equal distances in the same direction as the micrometer axis, causing the movable part of the positioner 6 and 7 to move in the same direction also. The flexibility of the y- and z-linkages 2 & 3 allows this movement to occur over a range of travel which is a relatively small proportion of the linkage lengths. The travel in this example is limited to 4 mm on each axis. This relatively small range of travel is a common feature of all flexure stages.

The operation of the Y axis is similar to that of the X axis.

The operation of the Z (vertical) axis differs in that the motion is effectively cranked round by 90 degrees, so that the z-micrometer 12 can be mounted horizontally and not vertically. Additional parts, namely a hinged driver plate 11, on which bears the spindle 34 of the horizontally mounted z-micrometer 12, and a horizontally extending ball-ended linkage 10, interconnecting the driver plate 11 and the z-plate 9, are used to transmit the z-motion. The z-micrometer 12 can thus be positioned conveniently in terms of the detailed design. Alternatively, the z-micrometer could act directly on the hinged z-plate 9, similar to the X and Y-micrometers, but in general this will be less convenient if the positioner is to be table mounted.

Figure 11:
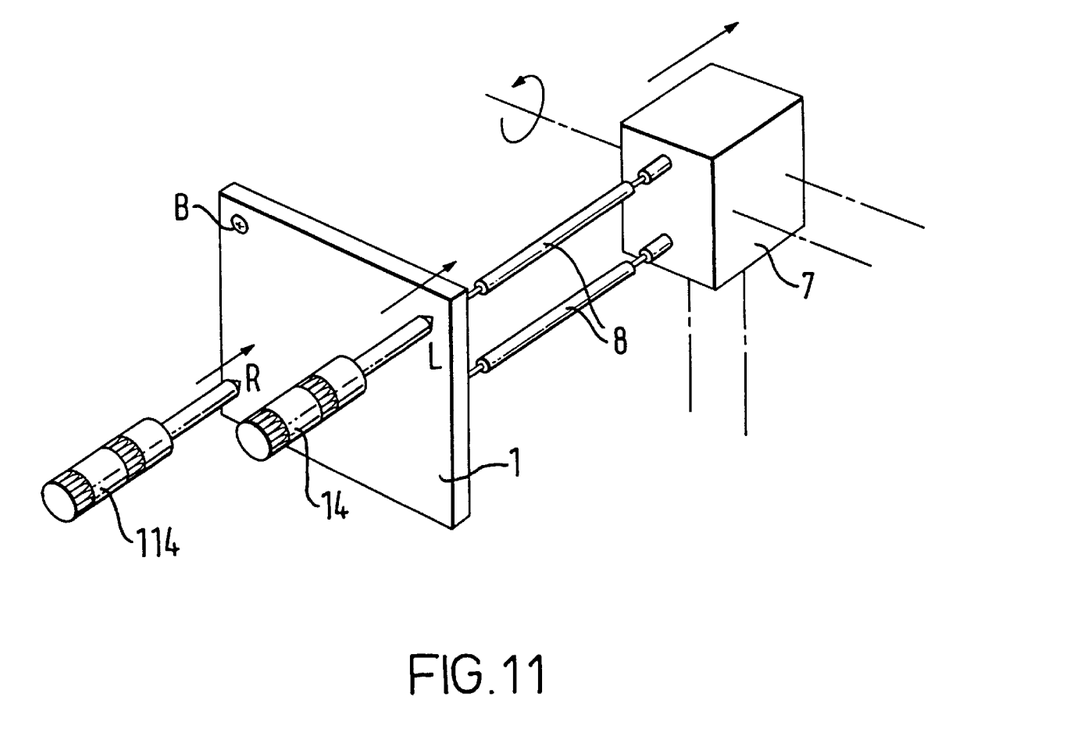
FIG. 11 is to illustrate the principles of operation of the positioning mechanism of the second embodiment of the invention and shows schematically a movable block, one pair of linkages, a pivot plate and two-actuators, one for linear motion and one for rotary motion.

FIG. 11 shows, highly schematically, the plate mounting arrangement adopted in the second embodiment of the invention, this arrangement being suitable for providing linear and rotary movement of the block 7. This is achieved by providing an arrangement in which two actuators 14 and 114, shown as micrometers, act on a pivotally mounted plate 1. The plate 1 is pivoted about a point B. The first micrometer 14 serves to impart a linear motion to the movable block 7. It acts at a point L such that a line LB, defined by points L and B, is perpendicular to the plane in which the two linkages 8 lie. The second micrometer 114 serves to impart a rotary motion to the movable block 7. It acts at a point R such that a line RB, defined by the points R and B, is parallel to the plane in which the two linkages 8 lie. Thus, when the micrometer 14 is actuated, the plate 1 hinges about the line RB, similar to the first embodiment, and causes both of the linkages 8 of the pair to move together, resulting in linear movement of the block 7. Moreover, when the micrometer 114 is actuated, the plate 1 hinges about the line LB and causes relative movement between the two linkages 8 of the pair, resulting in rotary movement of the block 7.

A compression spring (not shown) holds the plate 1 in contact with the ends of the spindles of the micrometers 14 and 114. A bolt (not shown) is bolted into a part of the case 13 with the shank of the bolt passing through a through hole in the plate 1. The compression spring is helical and arranged over the shank of the bolt bearing at one end on the plate 1 in a region surrounding the rim of the through hole and at the other end on the head of the bolt, preferably via a washer.

When three pivot plate mechanisms of the kind shown in FIG. 11 are used, a six-axis positioner can be provided, allowing movement of the block 7 in three linear directions X, Y, & Z and three rotary directions, YAW, ROLL & PITCH. Moreover, by correct dimensioning of the linkages it is possible to arrange for the three rotary motions of the movable block 7, associated with the three respective plates, to occur around axes that intersect at a common point P, as is the case in the concrete example of the second embodiment described further below.

If only rotary movement is required, but no linear movement, the pivot plate can be substituted with a hinged plate hinged about the line LB and the actuator 14 dispensed with.

Figure 12:
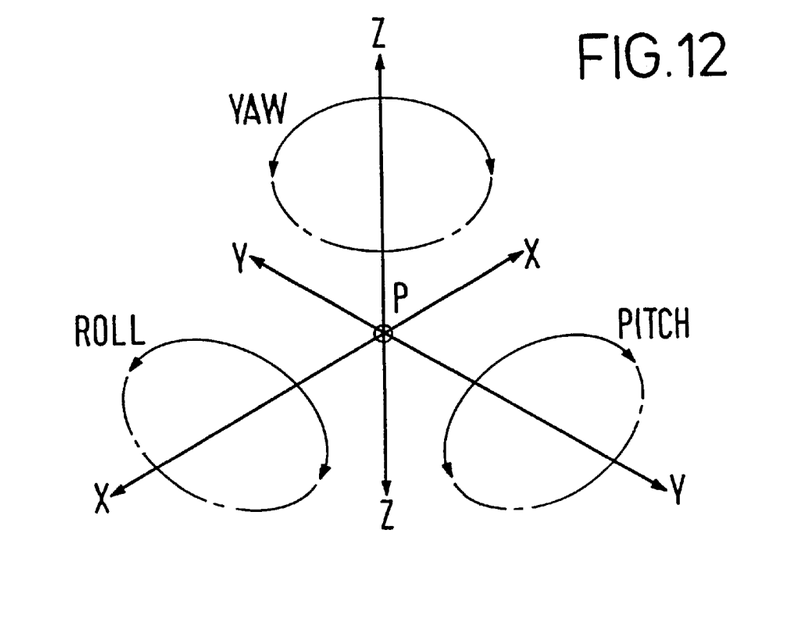
FIG. 12 defines, for the second embodiment, the geometrical relationship between the three linear degrees of freedom, namely X, Y & Z, the three rotary degrees of freedom, namely ROLL, PITCH & YAW, and the common pivot point, P, of the rotary degrees of freedom.
Figure 13:
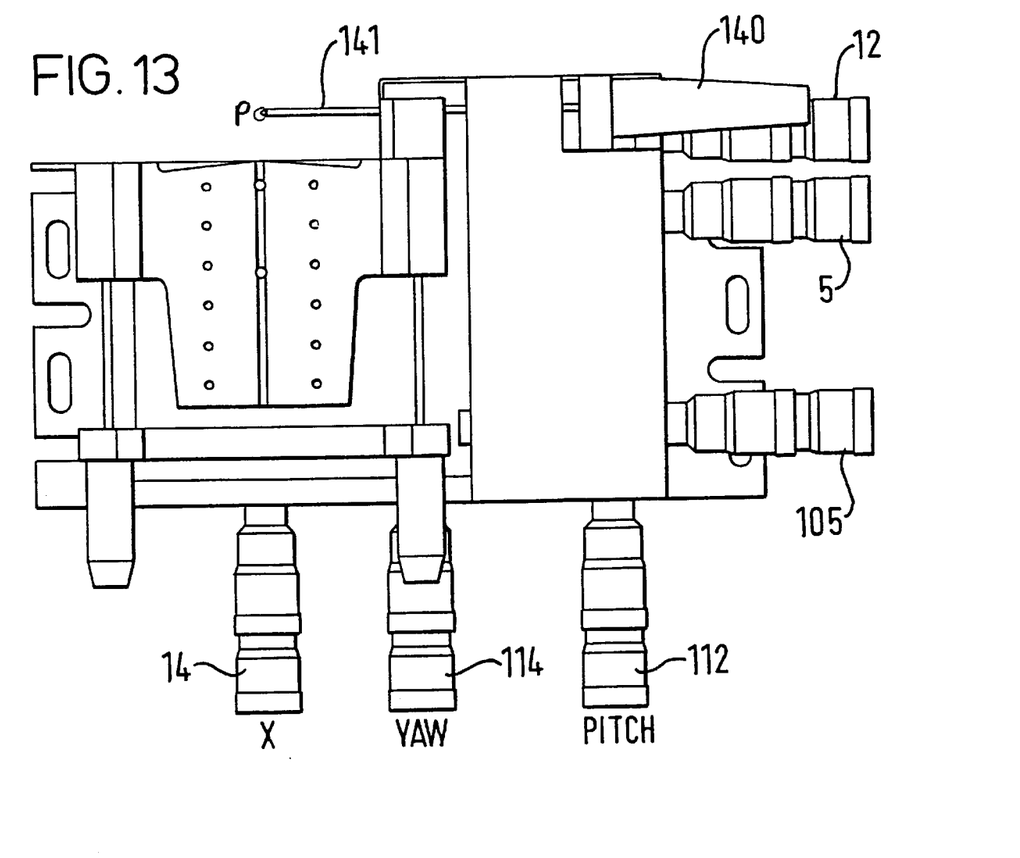
FIGS. 13 to 15 are scale technical drawings of the positioning mechanism of the second embodiment, with actuators fitted, FIG. 13 being a plan view, i.e. along the z-axis, FIG. 14 a side view along the x-axis and FIG. 15 a side view along the y-axis.
Figure 14:
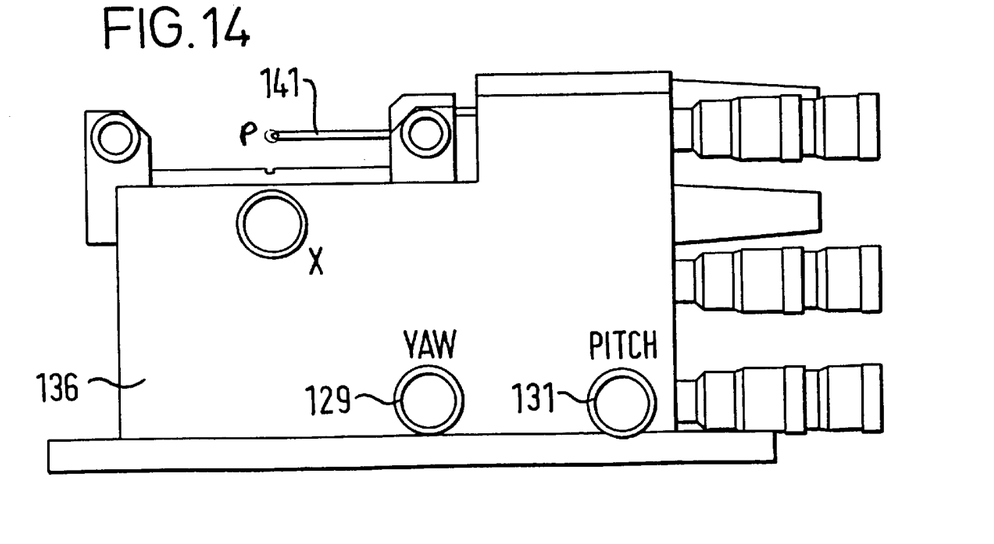
Figure 15:
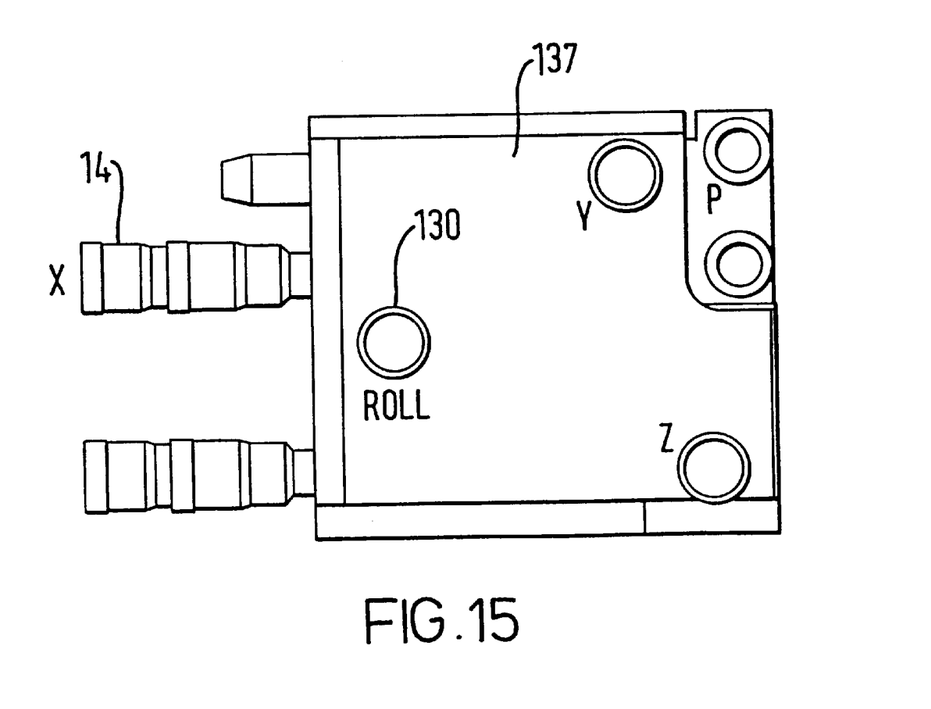
Figure 16:
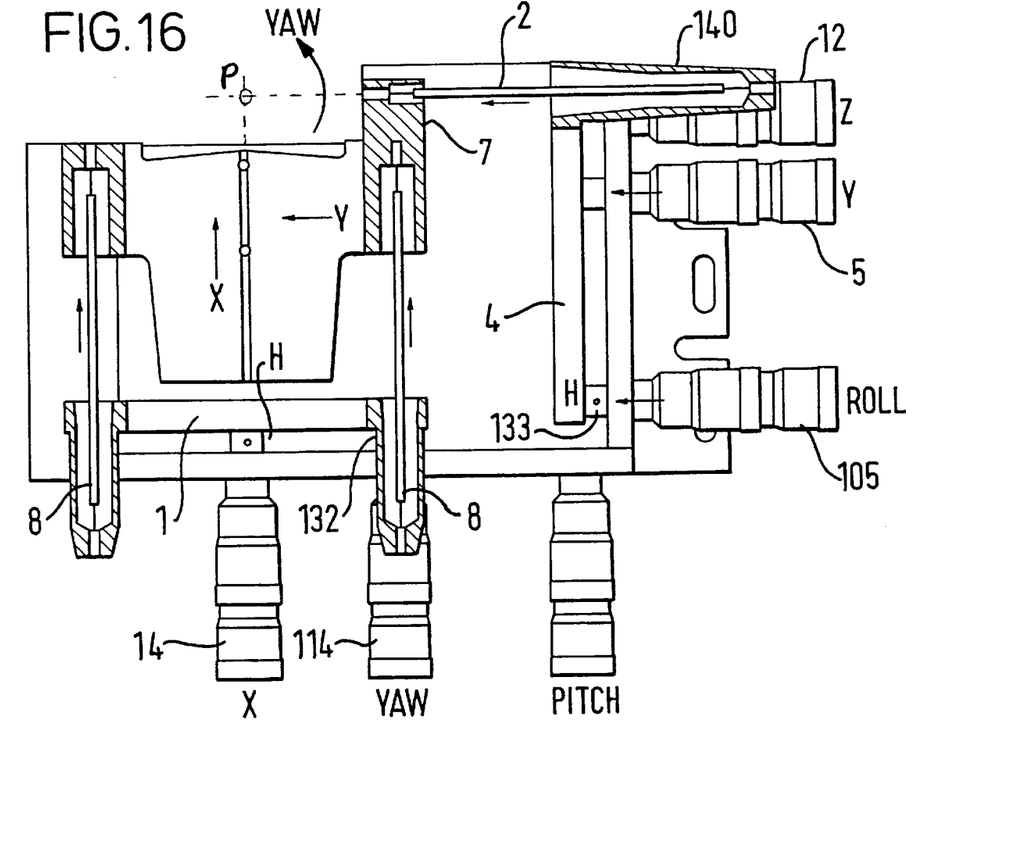
FIG. 16 is a plan view corresponding to FIG. 13, but in partial section to show parts of the positioning mechanism relating to the X & YAW and Y & ROLL axes.
Figure 17:
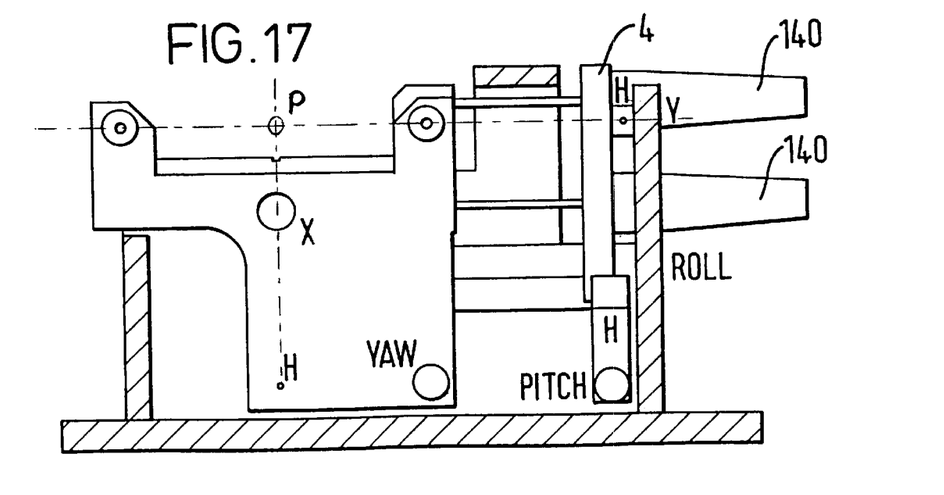
FIG. 17 is a side view corresponding to FIG. 14, but in partial section to show parts of the positioning mechanism relating to the X & YAW and Y & ROLL axes.
Figure 18:
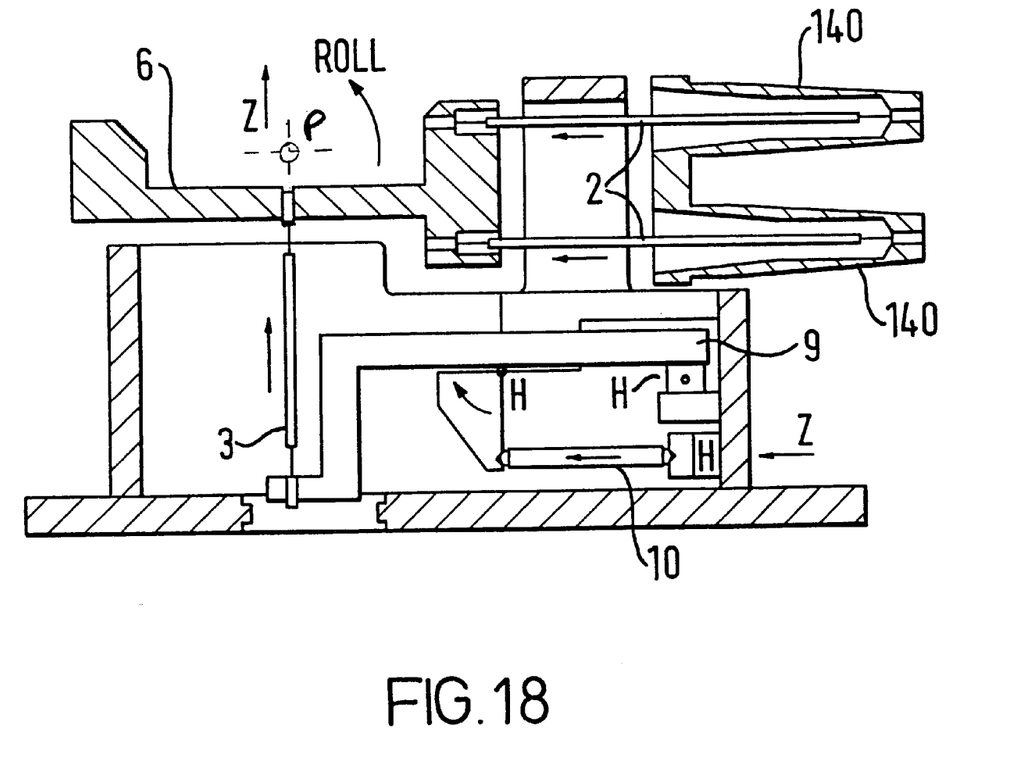
FIG. 18 is a side view corresponding to FIG. 14, but in partial section to show parts of the positioning mechanism relating to the Y & ROLL axes and Z & PITCH axes.
Figure 19:
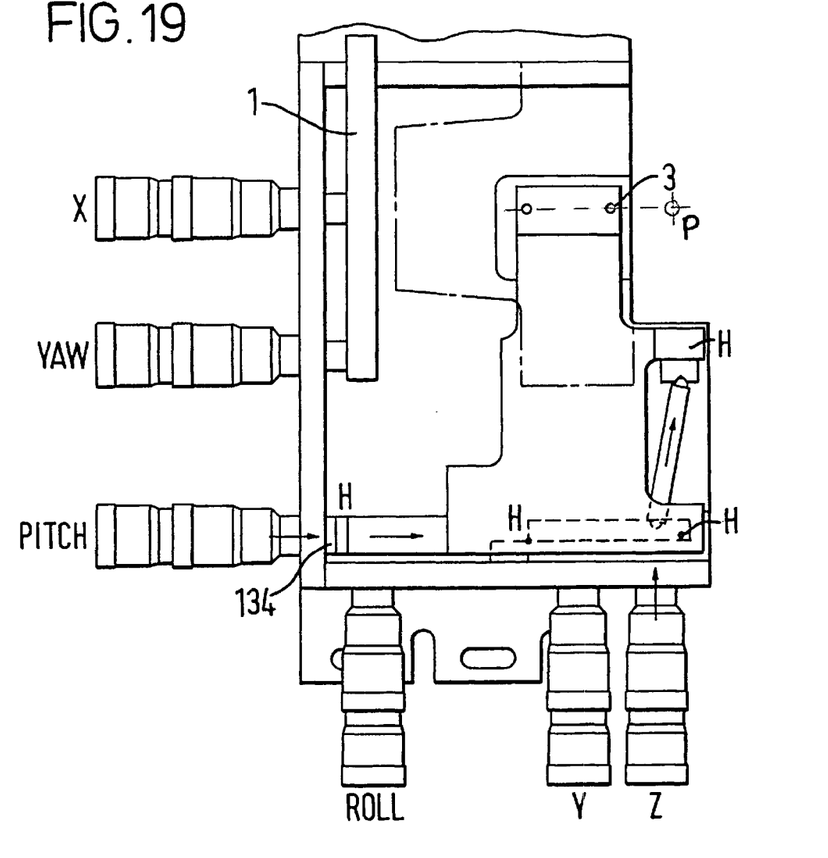
FIG. 19 is a plan view corresponding to FIG. 13, but in partial section to show parts of the positioning mechanism relating to the Z & PITCH axes.
Figure 20:
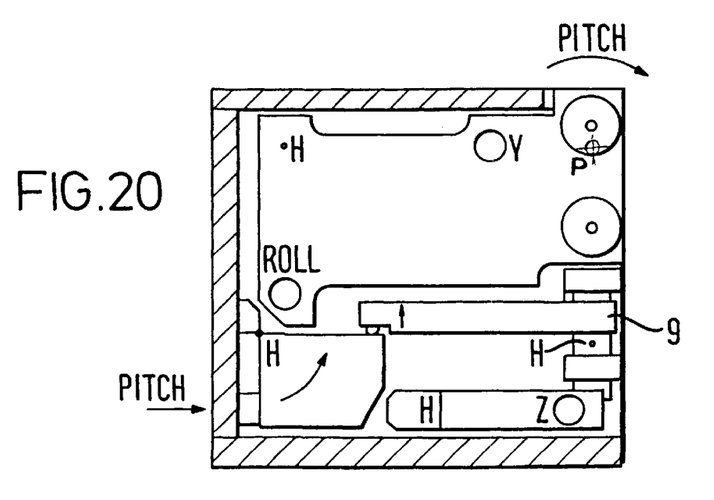
FIG. 20 is a side view corresponding to FIG. 15, but in partial section to show parts of the positioning mechanism relating to the Y & ROLL axes and Z & PITCH axes.

A practical example of a six-axis positioner according to the second embodiment is shown in FIGS. 13 to 20 and will now be described, also with reference to FIG. 12.

As in the three axis positioner, the movable part of the positioner is made of two parts 6 and 7 for ease of manufacture.

There are three pairs of flexible linkages 8, 2 & 3, joined to the movable block 7 and their respective pivot plates 1, 4 and 9. The attachment points of the linkages to the plates are extended by tapered tubes beyond the plane of the plates themselves. This is done so that the rotations occur about a common point P in space. This is often desirable.

The moving plates are mounted pivotally at a point B allowing pivoting in two directions. There are two micrometers acting on the movable x-plate. One micrometer 14, for x-actuation, tilts the plate about an axis parallel to the plane of the linkages. This moves the linkages through the same distance, causing the block 7 and platform 6 to translate. The other micrometer 114, for yaw-actuation, tilts the plate about an axis perpendicular to the plane of the linkages. This moves the linkages through different distances, in this example equal but opposite distances, causing the block 7 and platform 6 to rotate about the point P.

Operation of the movable Y-plate 4 is similar to the movable X-plate.

The movable Z-plate 9 differs in that motion is transmitted to it via additional parts, namely two lever blocks, a ball-ended linkage and a lever plate. The result is essentially the same as if the micrometers acted directly on the plate, however the additional parts allow the micrometers to be mounted horizontally in convenient positions.

REFERENCE NUMERALS

First (Second) Embodiment all 100+ numerals are for second embodiment 1 hinged (pivoted) x-plate
2 flexible y-linkages (y/roll linkages), 2 of
3 flexible z-linkages (z/pitch linkages), 2 of
4 hinged (pivoted) y-plate
5 y-actuator
105 roll-actuator
6 platform [top plate]
7 movable block
8 flexible x-linkages (x/yaw linkages), 2 of
9 hinged (pivoted) z-plate
10 ball-ended driver plate linkage for z
11 hinged driver plate for z
12 z-actuator
112 pitch-actuator
13 case
14 x-actuator
114 yaw-actuator
15 x-hinge
16 y-hinge
17 z-hinge
18 linkage actuator-end rigid locating portion
19 linkage carriage-end rigid locating portion
20 linkage central rigid portion
21 linkage actuator-end flexible portion
22 linkage carriage-end flexible portion
23 carriage linkage-locating means, in pairs
24 hinged-plate linkage-locating means, in pairs
25 hinged x-plate actuator-spindle contact region
26 hinged y-plate actuator-spindle contact region
27 hinged z-plate actuator-spindle contact region
28 driver plate hinge
29 x-actuator mounting means (part of case 13)
129 yaw-actuator mounting means (part of case 13)
30 y-actuator mounting means (part of case 13)
130 roll-actuator mounting means (part of case 13)
31 z-actuator mounting means (part of case 13)
131 pitch-actuator mounting means (part of case 13)
32 x-actuator drive spindle
132 yaw-actuator drive spindle
33 y-actuator drive spindle
133 roll-actuator drive spindle
34 z-actuator drive spindle
134 pitch-actuator drive spindle
35 base plate of case
36 side plate of case 13 accommodating x- and z-actuator mounting means
136 side plate of case 13 accommodating x- pitch- and yaw-actuator mounting means
37 side plate of case 13 accommodating y-actuator mounting means
137 side plate of case 13 accommodating roll- y- and z-actuator mounting means
140 tapered tube mount elongations
141 pivot point indicator probe

What I claim is:

1. A multi-axis flexure positioner for positioning a component in three linear positioning axes, comprising:
    a fixed part;
    a movable part; and
    three flexure members each extending from the fixed part to the movable part so as to suspend the movable part in space such that actuation of any one of the flexure members causes motion of the movable part along its associated linear positioning axis without causing motion of the movable part along either of the other two linear positioning axes.

2. The multi-axis flexure positioner of claim 1, wherein each flexure member comprises a pair of flexure linkages.

3. The multi-axis flexure positioner of claim 2, wherein the flexure linkages of each pair extend parallel to each other.

4. A multi-axis flexure positioner for positioning a component in three linear positioning axes and one rotational positioning axis, comprising:
    a fixed part;
    a movable part; and
    three flexure members each extending from the fixed part to the movable part so as to suspend the movable part in space such that actuation of any one of the flexure members causes motion of the movable part along its associated linear positioning axis without causing motion of the movable part along either of the other two linear positioning axes,
    wherein one of the three flexure members comprises a pair of flexure linkages that are movable together to cause motion of the movable part along the associated linear positioning axis, and movable relative to one another to cause motion of the movable part about the rotational positioning axis.

5. The multi-axis flexure positioner of claim 4, wherein the flexure linkages extend parallel to each other.

6. A multi-axis flexure positioner for positioning a component in three linear positioning axes and two rotational positioning axes, comprising:
    a fixed part;
    a movable part; and
    three flexure members each extending from the fixed part to the movable part so as to suspend the movable part in space such that actuation of any one of the flexure members causes motion of the movable part along its associated linear positioning axis without causing motion of the movable part along either of the other two linear positioning axes, wherein two of the three flexure members comprise respective pairs of flexure linkages that are movable together to cause motion of the movable part along the associated linear positioning axis, and movable relative to one another to cause motion of the movable part about the associated rotational positioning axis without causing motion of the movable part about the other rotational positioning axis.

7. The multi-axis flexure positioner of claim 6, wherein the flexure linkages of each pair extend parallel to each other.

8. The multi-axis flexure positioner of claim 6, wherein the rotational positioning axes intersect at a common point.

9. A multi-axis flexure positioner for positioning a component in three linear positioning axes and three rotational positioning axes, comprising:

a fixed part;

a movable part; and three flexure members each extending from the fixed part to the movable part so as to suspend the movable part in space such that actuation of any one of the flexure members causes motion of the movable part along its associated linear positioning axis without causing motion of the movable part along either of the other two linear positioning axes, wherein the three flexure members comprise respective pairs of flexure linkages that are movable together to cause motion of the movable part along the associated linear positioning axis, and movable relative to one another to cause motion of the movable part about the associated rotational positioning axis without causing motion of the movable part about the other two rotational positioning axes.

10. The multi-axis flexure positioner of claim 9, wherein the flexure linkages of each pair extend parallel to each other.

11. The multi-axis flexure positioner of claim 9, wherein the rotational positioning axes intersect at a common point.

12. A mechanism for a multi-axis flexure positioner for positioning in at least three axes, comprising:

a fixed part;

a movable part; and first, second and third pairs of flexure linkages connected to transmit actuation forces from the fixed part to the movable part, the flexure linkages of each pair extending parallel to each other to define a plane mutually perpendicular to the corresponding planes defined by the other two pairs of flexure linkages.

* * * * *

UNITED STATES PATENT AND TRADEMARK OFFICE
CERTIFICATE OF CORRECTION

PATENT NO.     : 6,467,762 B1
DATED          : October 22, 2002
INVENTOR(S)    : Philip Andrew Davies It is certified that error appears in the above-identified patent and that said Letters Patent is hereby corrected as shown below:

<u>Title page,</u>
Item [73], Assignee, should read -- Melles Griot Limited --

Signed and Sealed this

Twenty-second Day of July, 2003

JAMES E. ROGAN
*Director of the United States Patent and Trademark Office*